US011784736B2

(12) United States Patent
Mueller (10) Patent No.: US 11,784,736 B2
(45) Date of Patent: Oct. 10, 2023

(54) DIGITAL BROADCAST RECEIVER AND DIGITAL BROADCAST RECEIVER SYSTEM (71) Applicant: Hirschmann Car Communication GmbH, Neckartenzlingen (DE)

(72) Inventor: Thomas Mueller, Neckartenzlingen (DE)

(73) Assignee: Hirshmann Car Communication GmbH, Neckartenzlingen (DE)

( * ) Notice: Subject to any disclaimer, the term of this patent is extended or adjusted under 35 U.S.C. 154(b) by 366 days.

(21) Appl. No.: 17/090,323

(22) Filed: Nov. 5, 2020

(65) Prior Publication Data

US 2021/0143925 A1     May 13, 2021

(51) Int. Cl.
  *H04H 60/29*   (2008.01)
  *G10L 19/008*  (2013.01)
  *G10L 19/16*   (2013.01)
  *H04H 20/33*   (2008.01)

(52) U.S. Cl.
  CPC ........... *H04H 60/29* (2013.01); *G10L 19/008* (2013.01); *G10L 19/167* (2013.01); *H04H 20/33* (2013.01)

(58) Field of Classification Search
  CPC ........ H04H 60/29; H04H 20/33; H04H 20/26; H04H 2201/20; H04H 2201/60; H04H 40/18; H04H 40/36; G10L 19/008; G10L 19/167; Y02D 30/70; H04B 1/1646
  See application file for complete search history.

(56) References Cited

U.S. PATENT DOCUMENTS

| 2006/0085828 A1* | 4/2006 | Dureau | H04N 7/163 725/38 |
| 2007/0089148 A1* | 4/2007 | Oh | H04N 21/44209 725/132 |
| 2009/0010324 A1* | 1/2009 | Yamamoto | H04N 21/4382 375/240.01 |

FOREIGN PATENT DOCUMENTS

EP      0905931 A2     3/1999

OTHER PUBLICATIONS

European Patent Office Communication, dated Mar. 22, 2021, 8 pages.

* cited by examiner

Primary Examiner — Ankur Jain
(74) Attorney, Agent, or Firm — Barley Snyder (57) ABSTRACT

A digital broadcast receiver includes a first receiving module tunable to a foreground broadcast service to extract a program information, a first decoder module coupled to the first receiving module and decoding the program information, an output module switchably coupled to the first decoder module and adapted to output the program information, at least one second decoder module coupled to the first receiving module and tunable to a background broadcast service to decode a program information associated with the background broadcast service, and a control unit adapted to tune the first receiving module and the first decoder module to the foreground broadcast service and to tune each of the at least one second decoder modules to a background broadcast service. The control unit determines the foreground broadcast service based on a user input and determines the background broadcast services based on the foreground broadcast service and a predefined rule.

20 Claims, 9 Drawing Sheets prior art
Fig. 1 prior art
Fig. 2

DIGITAL BROADCAST RECEIVER AND DIGITAL BROADCAST RECEIVER SYSTEM

CROSS-REFERENCE TO RELATED APPLICATION

This application claims the benefit of the filing date under 35 U.S.C. § 119(a)-(d) of German Patent Application No. 202019106206.1, filed on Nov. 8, 2019.

FIELD OF THE INVENTION

The present invention relates to a receiver and, more particularly, to a digital broadcast receiver.

BACKGROUND

In the last few decades, analog broadcasting, which is transmitted by way of amplitude and frequency modulation, has been supplemented or replaced by digital broadcasting. Digital broadcast services are transmitted in Europe and Australia by the transmission standards DAB (Digital Audio Broadcasting) and DAB+, in North America by HD radio on AM and FM frequencies, in China by CDR (Chinese Digital Radio) and in several countries with a focus on India by DRM (Digital Radio Mondiale).

In order to increase the efficiency of digital broadcasting and to reduce the energy consumption of digital broadcasting systems, several broadcast services are transmitted in one frequency channel in most of the broadcasting standards mentioned above. For example, with DAB+, between 9 and 24 broadcast services are typically transmitted on one frequency channel, but up to 64 broadcast services are also possible for every frequency channel. The various broadcast services that are transmitted on the same frequency channel are also referred to as a "bouquet" or "ensemble".

Figure 1:
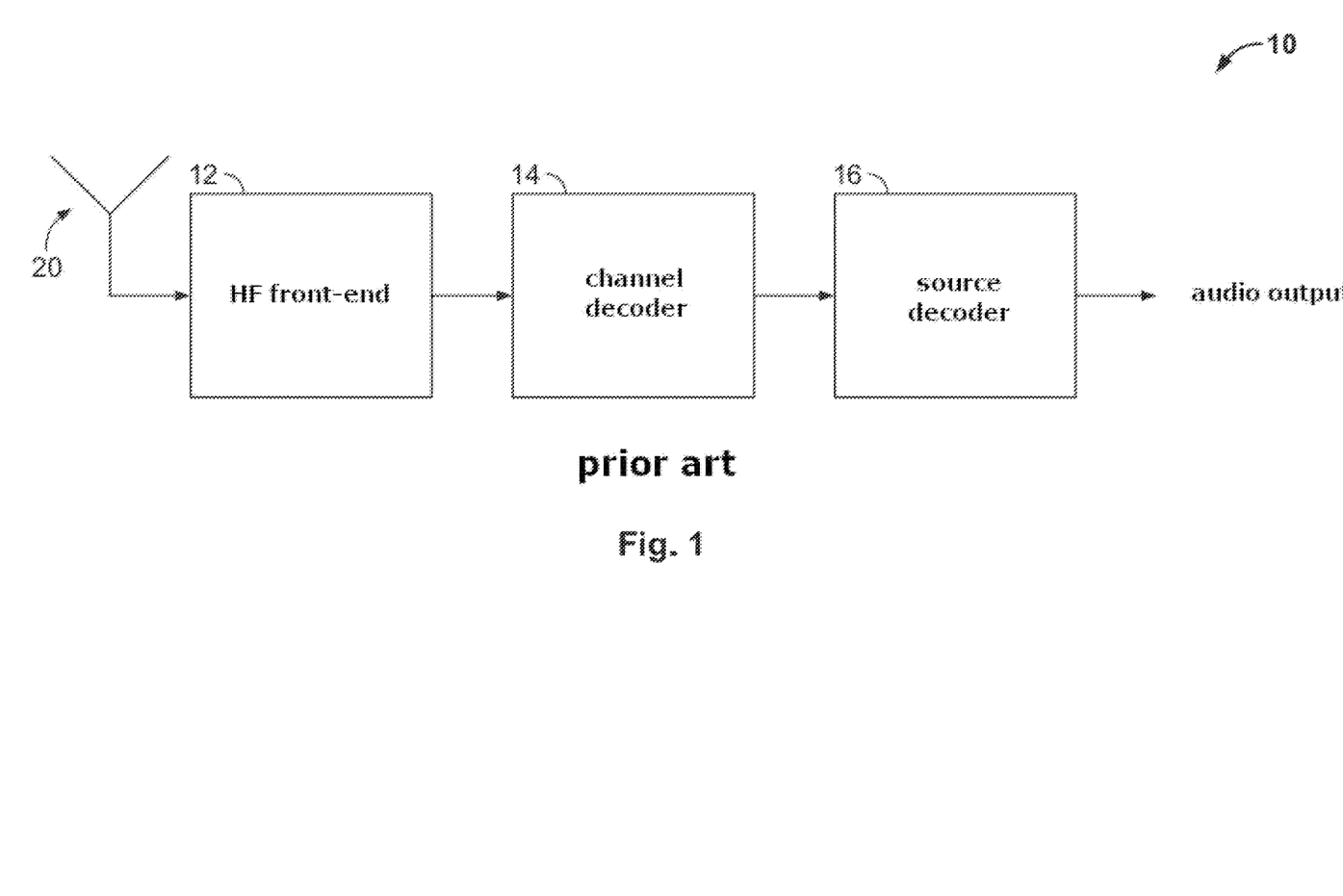
FIG. 1 is a block diagram of a conventional digital broadcast receiver.

FIG. 1 shows an exemplary block diagram of a known digital broadcast receiver 10. Digital broadcast receiver 10 is coupled to an antenna 20, with the aid of which digital broadcast receiver 10 can receive a digital broadcast service. Once a broadcast service has been chosen, e.g. by a user, digital broadcast receiver 10 selects the program information associated with the selected broadcast service from the digital broadcast signal and converts it to an audio signal that is made available to the user via an audio output. For this purpose, digital broadcast receiver 10 comprises an HF front-end module 12 (HF is the abbreviation for high frequency), a channel decoder 14, and a source decoder 16.

HF front-end module 12 selects the frequency channel of the selected broadcast service and converts the selected frequency channel to a data stream. The data stream is output to channel decoder 14 which extracts the program information associated with the selected broadcast service from the data stream and outputs it to source decoder 16. In order to bridge brief interruptions in reception, channel decoder 14 can comprise memory elements in which the program information of the selected broadcast service is temporarily stored. Source decoder 16 decodes the program information associated with the selected broadcast service and converts it to the audio signal.

When digital broadcast receiver 10 is switched, the processing process performed in digital broadcast receiver 10 is reinitialized and all of the memory elements contained therein are filled with new data. Only then can a newly selected broadcast service be output as an audio signal at the audio output. A switching process of known digital broadcast receiver 10 is therefore very slow, which entails a loss of quality for the user who is used to the much faster switching behavior of analog broadcast receivers.

Figure 2:
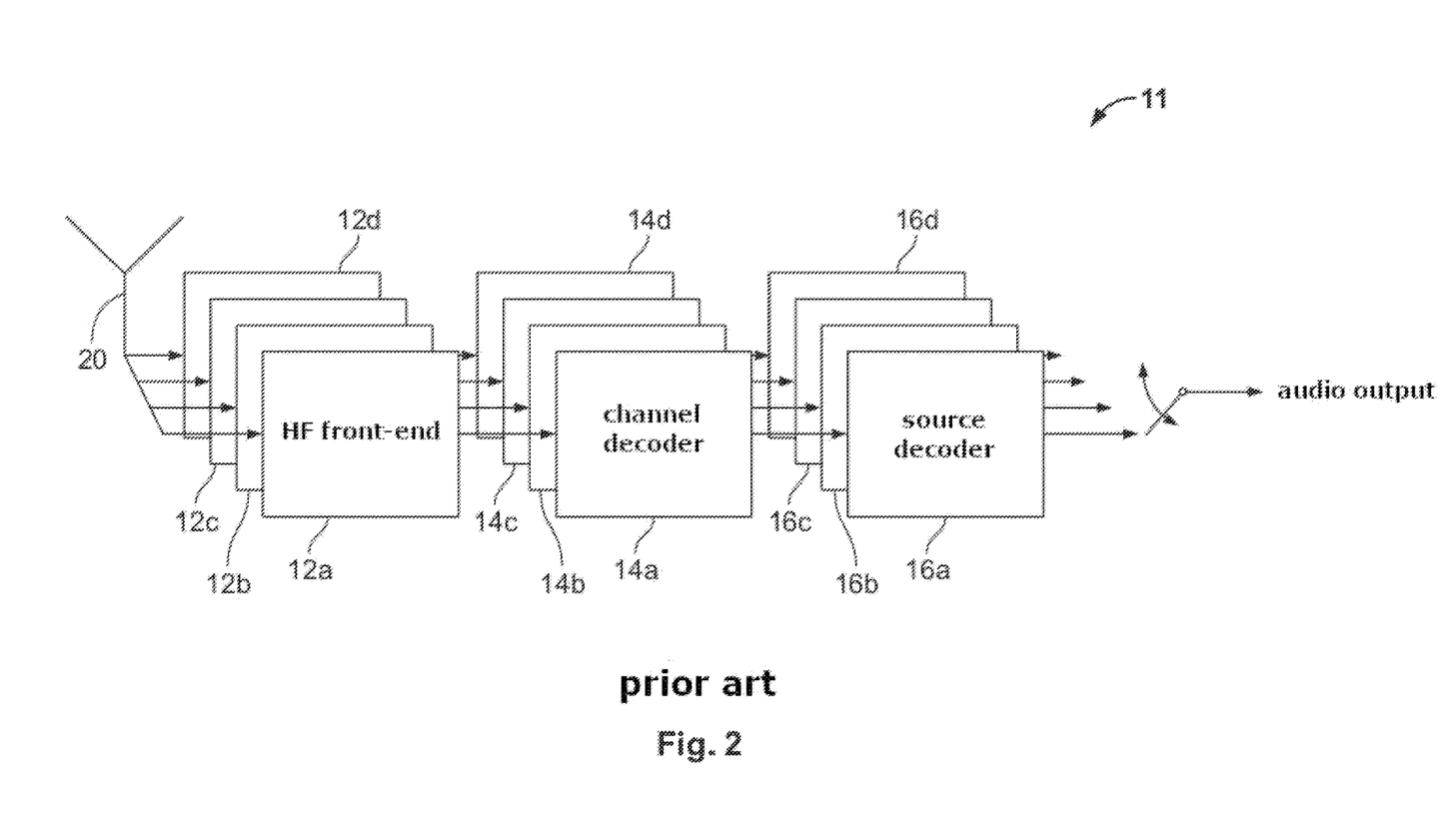
FIG. 2 is a block diagram of another conventional digital broadcast receiver.

In order to accelerate the switching process, it is known to parallelize a plurality of reception paths. FIG. 2 shows a block diagram of a known digital broadcast receiver 11 in which a plurality of reception paths is parallelized. Each reception path consists of one of HF front-end modules 12a to 12d which is coupled to antenna 20, one of channel decoders 14a to 14d and one of source decoders 16a to 16d. Conventional digital broadcast receiver 11 has one respective receiving path for each available broadcast service.

In order to output program information associated with a selected broadcast service in decoded form as an audio signal, precisely one of source decoders 16a to 16d is coupled to the audio output. Since conventional digital broadcast receiver 11 processes every available broadcast service in parallel, the audio output can, if necessary, be coupled to another of source decoders 16a to 16d in order to output the program information associated with the respective broadcast service in decoded form as an audio signal. This greatly reduces the switching time between the available broadcast services. Due to the parallel processing of all available broadcast services, however, an immense computing effort is required, which entails the use of a very large amount of energy.

SUMMARY

A digital broadcast receiver includes a first receiving module tunable to a foreground broadcast service to extract a program information, a first decoder module coupled to the first receiving module and decoding the program information, an output module switchably coupled to the first decoder module and adapted to output the program information, at least one second decoder module coupled to the first receiving module and tunable to a background broadcast service to decode a program information associated with the background broadcast service, and a control unit adapted to tune the first receiving module and the first decoder module to the foreground broadcast service and to tune each of the at least one second decoder modules to a background broadcast service. The control unit determines the foreground broadcast service based on a user input and determines the background broadcast services based on the foreground broadcast service and a predefined rule.

BRIEF DESCRIPTION OF THE DRAWINGS

The invention will now be described by way of example with reference to the accompanying Figures, of which.

DETAILED DESCRIPTION OF THE EMBODIMENT(S)

The present invention shall be explained in detail by way of the embodiments illustrated in the figures. Same elements are there designated with same reference numerals and same component designations. Furthermore, some features or combinations of features from the different embodiments shown and described can also be independent inventive solutions by themselves or solutions according to the invention.

Figure 3:
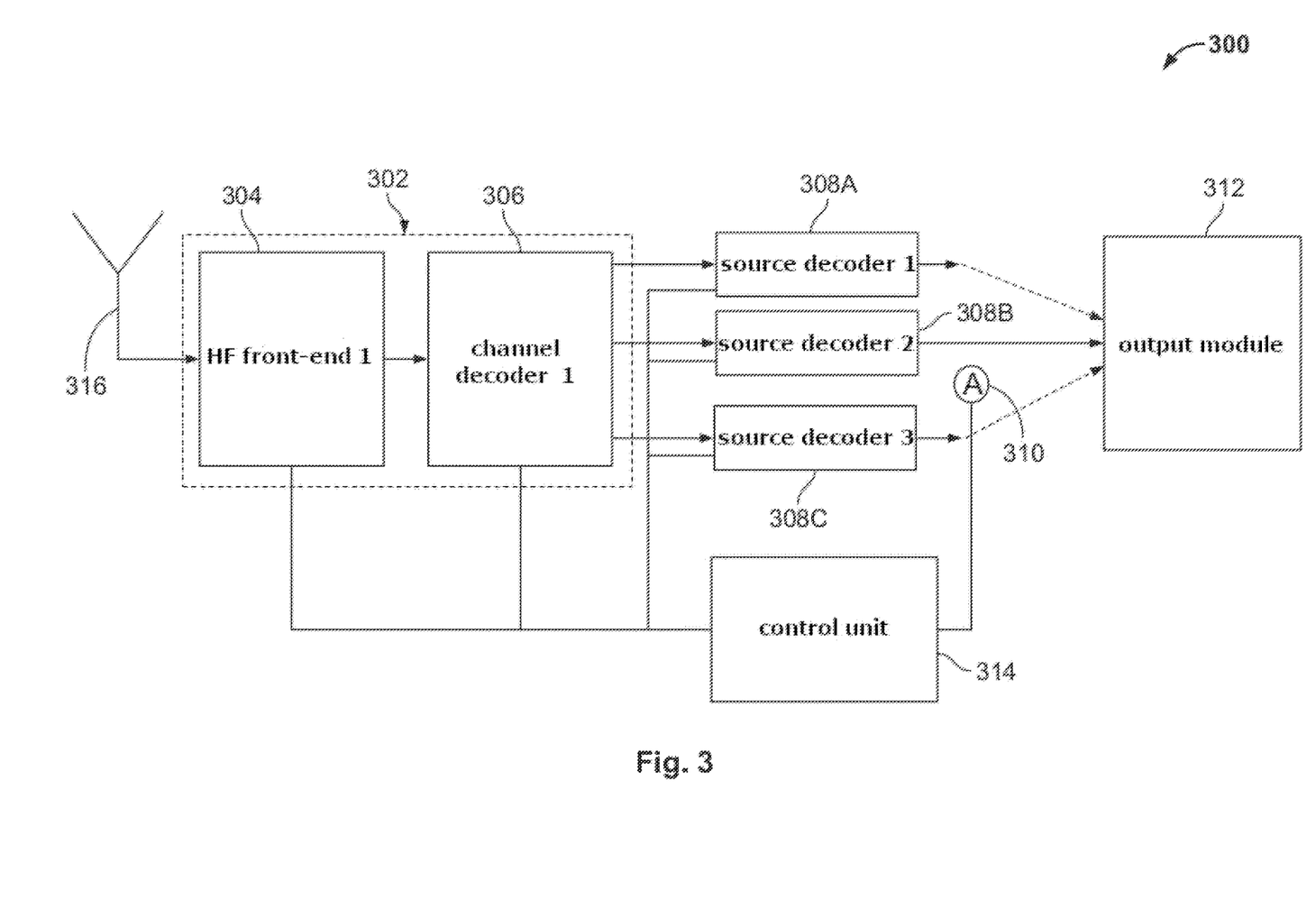
FIG. 3 is a block diagram of a digital broadcast receiver according to an embodiment.

FIG. 3 shows a block diagram of digital broadcast receiver 300 according to a first embodiment of the present invention. Digital broadcast receiver 300 comprises a first receiving module 302 which has an HF front-end module 304 and a channel decoder 306. First receiving module 302 is coupled to a plurality of decoder modules 308A, 308B and 308C. Each decoder module 308A, 308B and 308C comprises a source decoder. Exactly one of decoder modules 308A to 308C is coupled to output module 312 via an output switching device. Furthermore, digital broadcast receiver 300 comprises a control unit 314 which is adapted to control receiving module 302 and decoder modules 308A, 308B and 308C.

As shown in FIG. 3, first receiving module 302 can be coupled to an antenna 316 that can receive a digital broadcast signal. During operation, first receiving module 302 is tuned by control unit 314 to a broadcast service selected by a user, also referred to hereinafter as a foreground broadcast service, in order to extract program information associated with the foreground broadcast service. The program information can contain audio signals that are output with the aid of a speaker as well as, for example, information about the associated broadcast service or a current broadcast program of the associated broadcast service that can be shown on a display. The program information can also contain traffic information.

In order to extract the program information associated with the foreground broadcast service, HF front-end module 304 selects a frequency channel on which the foreground broadcast service is transmitted and converts the selected frequency channel to a data stream. For this purpose, HF front-end module 304 can comprise one or more frequency filters that restrict the digital broadcast signals received by antenna 316 to the frequency range of the selected frequency channel. In order to amplify the signal of the selected frequency channel, HF front-end module 304 can furthermore have electronic amplifiers. Furthermore, a mixer and a local oscillator can be provided for converting the frequency band of the selected frequency channel to a higher or lower frequency band.

HF front-end module 304 converts the analog signal of the selected frequency channel processed in this manner with the aid of an analog-digital converter, which is also referred to as an A/D converter, to a digital signal. In broadcast services, this digital signal is typically OFDM (orthogonal frequency-division multiplexing)-encoded. The digital signal is subsequently demodulated by HF front-end module 304 in accordance with the modulation method used and converted to a data stream that is output to channel decoder 306. If the digital broadcast signal is transmitted using the DAB+ broadcasting standard, the modulation method used is, for example, quadrature phase shift keying (QPSK). However, modulation methods such as quadrature amplitude modulation (QAM) are also known from other broadcasting standards. It is also possible to extract broadcast services which are encoded according to other broadcasting standards, such as HD radio, Chinese Digital Radio (CDR), Digital Radio Mondiale (DRM) or other standards.

Figure 4:
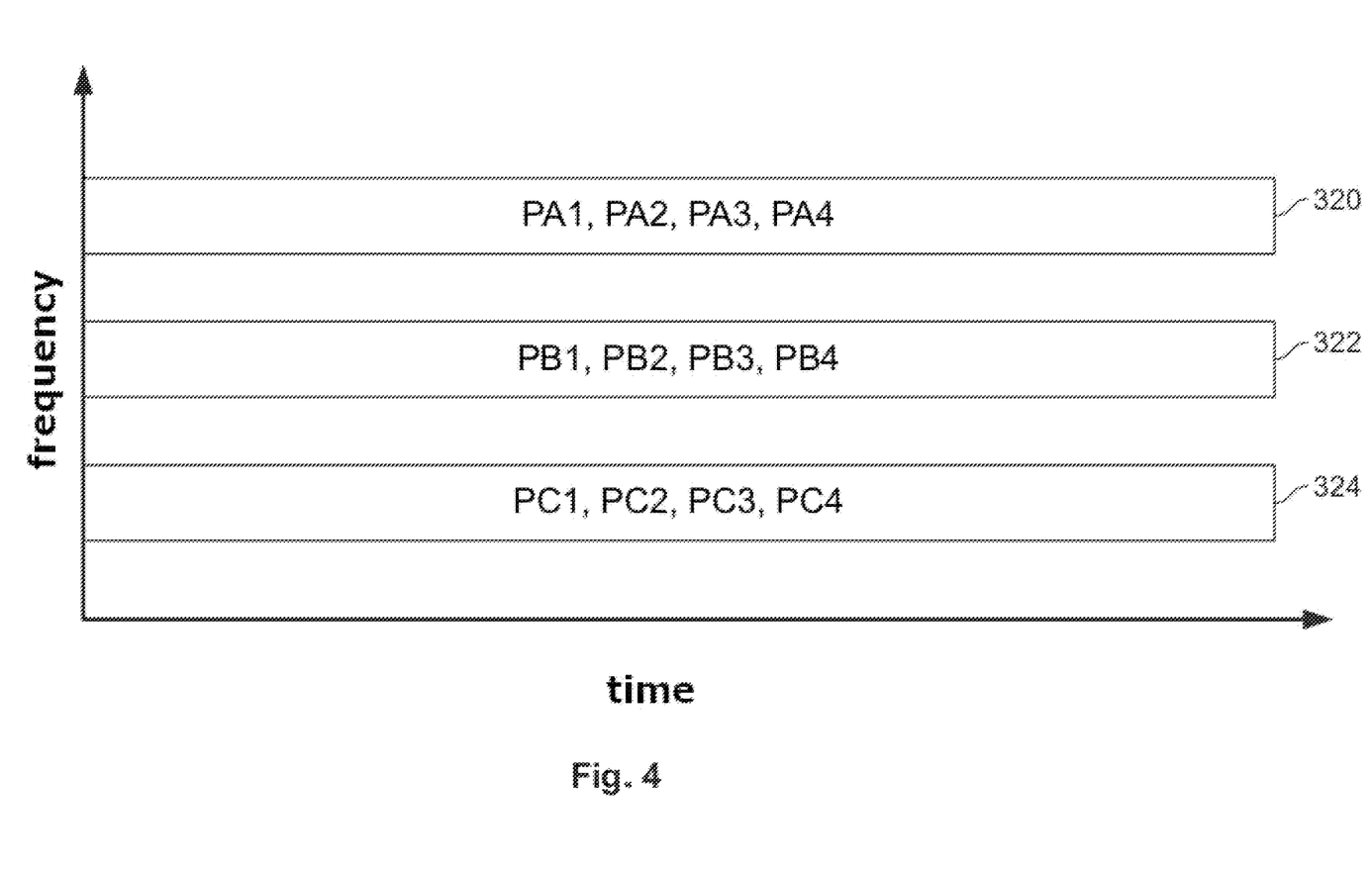
FIG. 4 is a schematic graph of several frequency channels which are transmitted in accordance with a digital broadcasting standard.

FIG. 4 shows a schematic illustration of several frequency channels 320, 322 and 324 which are transmitted in accordance with a digital broadcasting standard. The frequency is plotted on one of the axes and time on the other axis. As shown in FIG. 4, frequency channels 320, 322 and 324 are distributed in a specific frequency band and each have a defined bandwidth. In the case of DAB or DAB+, the frequency channels are transmitted, for example, in the frequency band from 174 MHz to 240 MHz and each have a bandwidth of 1.536 MHz. However, other broadcasting standards also transmit frequency channels in other frequency bands and with other bandwidths, so that digital broadcast receiver 300 is not restricted to the reception of frequency channels in this frequency band.

Furthermore, FIG. 4 schematically shows that each frequency channel transmits several broadcast services which are transmitted in the same frequency band. For example, frequency channel 320 transmits broadcast services PA1, PA2, PA3 and PA4, frequency channel 322 broadcast services PB1, PB2, PB3 and PB4, and frequency channel 324 broadcast services PC1, PC2, PC3 and PC4. The number of 4 broadcasting services for every frequency channel is there merely by way of example. As already mentioned, for example, with DAB+, between 9 and 24 broadcast services are typically transmitted on one frequency channel, but up to 64 broadcast services are also possible for every frequency channel.

In the event that digital broadcast receiver 300 is set to receive broadcast services that are transmitted according to the DAB or DAB+ standard or a similar standard, then HF front-end module 304 selects a frequency channel and converts the frequency channel to a data stream, for example, frequency channel 320, if one of broadcast services PA1, PA2, PA3 and PA4 is selected as the foreground broadcast service.

Channel decoder 306 receives the data stream that is output by the HF front-end module. Channel decoder 306 decodes the data stream and carries out an error correction process for correcting any transmission errors. Channel decoder 306 then extracts the program information associated with the foreground broadcast channel. For this purpose, channel decoder 306 identifies the data blocks which each transport the program information of a specific broadcast service. Channel decoder 306 can recognize, for example, by way of a program identifier (PID) contained in a header of each data block, which program information is transported in a specific data block. In this way, channel decoder 306 can identify the program information associated with the foreground broadcast service and extract it from the data stream.

Furthermore, channel decoder 306 also extracts from the data stream program information associated with background broadcast services that are determined by the control unit based on the foreground broadcast service and a predefined rule, which shall be described later. Channel decoder 306 can optionally have a memory in which the extracted program information of the foreground broadcast service and the background broadcast services can be stored temporarily. Brief reception failures can be compensated in this manner. Channel decoder 306 outputs the program information of an associated broadcast service to each one of decoder modules 308A, 308B and 308C.

The mode of operation of channel decoder 306 shall now be elucidated using an example. For example, if broadcast service PA1 in FIG. 4 is selected as the foreground broadcast service, then channel decoder 306 identifies all data blocks that are associated with broadcast service PA1 and extracts them in order to output the program information associated with broadcast service PA1 to the decoder module which is coupled to the output module (in the example shown in FIG. 3, first decoder module 308B). In this case, control unit 314 can furthermore determine at least one of broadcast services PA2, PA3 and PA4 as the background broadcast service, for example, broadcast service PA3.

If broadcast service PA3 is determined as the background broadcast service, then channel decoder 306 also identifies all data blocks that are associated with broadcast service PA3 and extracts them in order to output the program information associated with broadcast service PA3 to the decoder module that is not coupled to the output module (in the example shown in FIG. 3, second decoder module 308A or 308C).

Decoder modules 308A, 308B and 308C each have a source decoder. Each source decoder receives the program information of an associated broadcast service that is output from channel decoder 306. The received program information is there encoded and is decoded by each of the source decoders in order to be able to be converted to an output signal. For example, the MPEG standard is used there as the encoding standard.

The number of decoder modules is not fixed at three, but can be selected as N+1 based on a desired number N of background programs. Where N is a natural number. According to the present invention, digital broadcast receiver 300 comprises at least two decoder modules, namely a first decoder module (in FIG. 3, for example, decoder module 308B) which can be tuned to a foreground broadcast service, and at least one second decoder module (in FIG. 3, for example, decoder modules 308A and 308C) which can be tuned to a background broadcast service determined by control unit 314.

Output switching device 310 is controlled by control unit 314 and switchably couples precisely that one of decoder modules 308A, 308B and 308C which is tuned to the selected foreground broadcast service to output module 312. It then initially serves as the first decoder module, while the remaining decoder modules serve as second decoder modules. For example, FIG. 3 shows an arrangement in which decoder module 308B is switchably coupled to output module 312 (shown by the solid arrow) and hence serves as the first decoder module. Decoder modules 308A and 308C initially serve as second decoder modules and are not coupled to output module 312 (shown by the dashed arrows). Arrangements in which one of decoder modules 308A and 308C serves as the first decoder module are of course also possible.

Output module 312 receives the program information associated with the foreground broadcast service and outputs it as an output signal. The output module can comprise speakers which output an audio signal contained in the output signal. In addition, the output module can comprise a display which outputs a display signal contained in the output signal. However, output module 312 can also merely comprise an interface that outputs the output signal to external devices, such as an external speaker or an external display.

Control unit 314 controls the processes performed by digital broadcast receiver 300. In particular, control unit 314 determines a foreground broadcast service based on an input signal that control unit 314 receives in response to user input. It can be entered, for example, by way of an input unit of digital broadcast receiver 300.

After determining the foreground broadcast service, control unit 314 tunes first receiving module 302 and the first decoder module (in the example shown in FIG. 3, decoder module 308B) to the foreground broadcast service. In addition, control unit 314 ensures that output module 312 is coupled to the first decoder module.

Furthermore, control unit 314 determines background broadcast services based on the selected foreground broadcast service and a predefined rule. As mentioned above, the number of background broadcast services corresponds to the number of decoder modules 308A, 308B and 308C minus 1. In the example shown in FIG. 3, it is therefore possible to determine two background broadcast services.

The predefined rule according to which the background broadcast services are determined is there intended to make use of a strategy of a user when the broadcast services are newly selected in order to predict the broadcast service that is likely to be selected next.

For example, it can be most likely that the user will select a broadcast service adjacent to the selected foreground broadcast service as the next broadcast service. In this case, control unit 314 can use a list stored in a memory unit of digital broadcast receiver 300 to determine a number of adjacent broadcast services of the selected foreground broadcast service that corresponds to the number of background broadcast services in respective digital broadcast receiver 300. For this purpose, the broadcast services are sorted either alphabetically or by frequency in the list.

Control unit 314 then determines the broadcast services stored in the list immediately before or after the foreground broadcast service as being adjacent broadcast services until the number of adjacent broadcast services equals the number of possible background broadcast services. Control unit 314 then determines the adjacent broadcast services as background broadcast services based on the predefined rule.

It can alternatively be that the user selects a broadcast service that was last listened to as the next broadcast service. With the aid of a list stored in a memory unit of digital broadcast receiver 300, control unit 314 can in this case determine a certain number of broadcast services last selected that corresponds to the number of background broadcast services in respective digital broadcast receiver 300. For this purpose, most recently selected broadcast services are stored in the list. Control unit 314 then determines the broadcast services most recently selected as background broadcast services based on the predefined rule. Alternatively, broadcast services that are, for example, preferred by the user can also be stored in the list. Control unit 314 then determines the preferred broadcast services as background broadcast services based on the predefined rule.

It can furthermore be that the user selects a broadcast service that was most listened to as the next broadcast service. With the aid of a list stored in a memory unit of digital broadcast receiver 300, control unit 314 can in this case determine a certain number of broadcast services most frequently selected that corresponds to the number of background broadcast services in respective digital broadcast receiver 300. For this purpose, a number is assigned to each broadcast service in the list and corresponds to the frequency of occurrence with which the corresponding broadcast service was previously selected as the foreground broadcast service. The frequency of occurrence is increased by one each time the broadcast service is selected as the foreground broadcast service by the user. Instead of the frequency of occurrence, a relative frequency of occurrence or a probability which is calculated on the basis of the frequency of occurrence can of course also be stored in the list.

Control unit 314 then determines the broadcast services in the list to which the greatest frequency of occurrence has been assigned as the most frequently selected broadcast service until the number of the most frequently selected broadcast services equals the number of possible background broadcast services. Control unit 314 then determines the broadcast services most frequently selected as background broadcast services based on the predefined rule.

Alternatively, the most frequently selected broadcast services can be determined in dependence of the selected foreground broadcast service. For this purpose, each of the stored radio services in the list stored in the memory unit of digital radio receiver 300 can be assigned a number for each selected foreground radio service that corresponds to the frequency of occurrence with which the respective broadcast service was previously selected as the new foreground radio service subsequent to the selected foreground radio service. Where the frequency of occurrence of the broadcast service for the selected foreground broadcast service is increased by one each time the user selects the respective broadcast service as the new foreground broadcast service subsequent to the selected foreground broadcast service. Instead of the frequency of occurrence, a relative frequency of occurrence or a probability which is calculated on the basis of the frequency of occurrence can of course also be stored in the list.

Control unit 314 then first determines the frequencies of occurrence assigned to the broadcast services based on the selected foreground broadcast service. Control unit 314 then determines the broadcast services with the greatest frequency of occurrence assigned for the selected foreground broadcast service as the most frequently selected broadcast services until the number of most frequently selected broadcast services equals the number of possible background broadcast services. Control unit 314 then determines the broadcast services most frequently selected as background broadcast services based on the predefined rule.

Control unit 314 can determine the background broadcast services anew each time after an input signal has been received in response to the selection of a new foreground broadcast service.

Once the background broadcast services have been determined, control unit 314 tunes the respective second decoder modules (in the example shown in FIG. 3, decoder modules 308A and 308C) to one of the respective determined background broadcast services. In this way, each of the second decoder modules can decode the program information associated with a background broadcast service and convert it to a background output signal.

With the aid of output switching device 310, control unit 314 can couple output module 312 to one of the second decoder modules if the corresponding background broadcast service has been selected as the new foreground broadcast service. Output module 312 can then output the prior background output signal of the corresponding decoder module as a new output signal without any great delay. In this way, the switching time between the foreground broadcast service and the respective background broadcast service can be greatly reduced.

Figure 5:
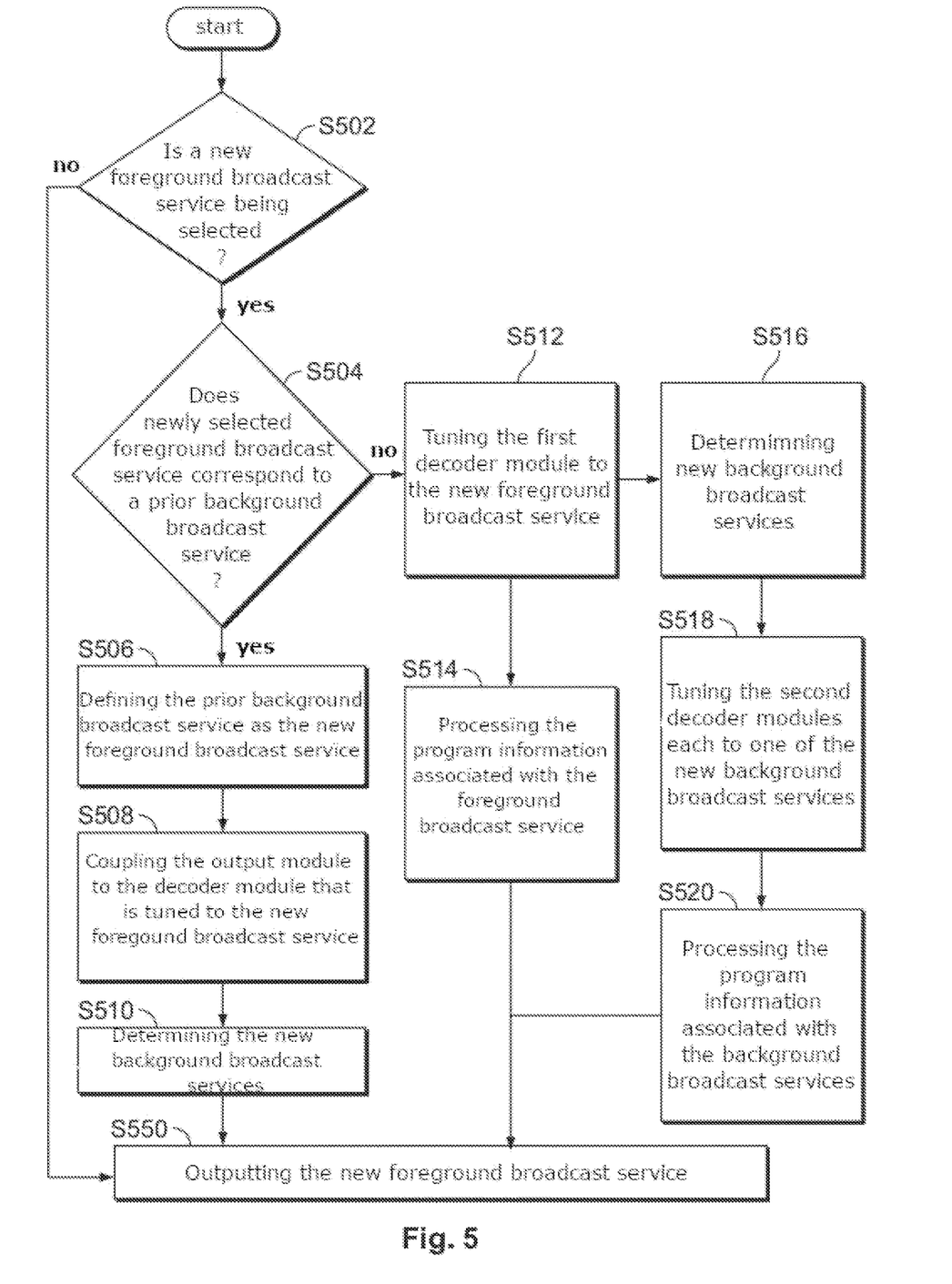
FIG. 5 is a flowchart of a method for switching a broadcast service with the digital broadcast receiver of FIG. 3.

A process sequence which is carried out by digital broadcast receiver 300 shall now be explained with reference to FIG. 5. For this purpose, FIG. 5 shows a flow chart of a method for switching a broadcast service with the aid of digital broadcast receiver 300. For illustration purposes, it is assumed by way of example that decoder module 308B initially serves as the first decoder module while decoder modules 308A and 308C initially serve as the second decoder modules. However, all other arrangements described above are also conceivable.

Control unit 314 repeats the process shown in FIG. 5 at a fixed time interval. This can be, for example, between 0 and 1s. In a first step (S502), control unit 314 verifies whether an input signal has been received in the preceding time interval that indicates the selection of a new foreground broadcast service by the user. If no input signal has been received ("no" in S502), digital broadcast receiver 300 continues to output the prior foreground broadcast service (S550) and ends the process. If an input signal has been received ("yes" in S502), control unit 314 verifies whether the newly selected foreground broadcast service corresponds to one of the prior background broadcast services (S504).

If this is the case ("yes" in S504), control unit 314 defines the prior background broadcast service as the new foreground broadcast service (S506) and controls output switching device 310 in order to couple the output module to that one of second decoder modules 308A and 308C (S508) which is tuned to the new foreground broadcast service. Control unit 314 then determines new background broadcast services (S510) in accordance with one of the predefined rules described above and tunes the new second decoder modules to the new background broadcast services. The digital broadcast receiver now outputs the new foreground broadcast service (S550).

If the newly selected foreground broadcast service in step S504 does not correspond to any of the prior broadcast services ("no" in S504), then the process moves to step S512. In this step, the control unit tunes first receiving module 302 and first decoder module 308B to the new foreground broadcast service. First decoder module 308B is there tuned to the new foreground broadcast service since the former is already coupled to the output module. The digital broadcast receiver then starts processing (S514) the program information associated with the foreground broadcast service.

In addition, control unit 314 determines new background broadcast services according to one of the predefined rules described above (S516). The control unit then tunes second decoder modules 308A and 308C to the new background broadcast services so that second decoder modules 308A and 308C can process the program information associated with the new background broadcast services (S520). The process ends with the output of the new foreground broadcast service (S550).

It is to be noted at this point that, with digital broadcast receiver 300 according to the first embodiment of the present invention, control unit 314 determines only broadcast services as background broadcast services that are transmitted in the same frequency channel as the foreground broadcast service.

Figure 6:
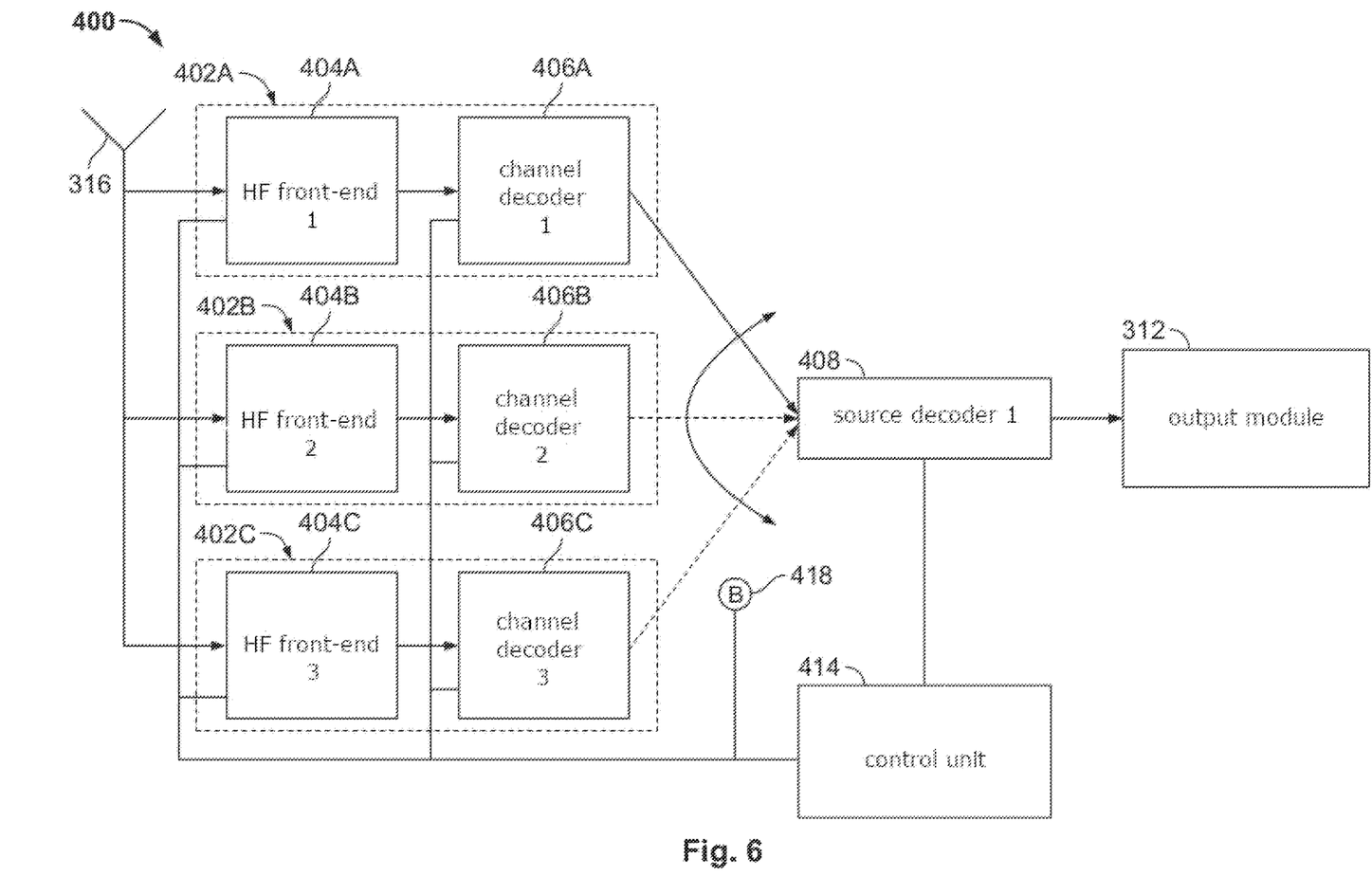
FIG. 6 is a block diagram of a digital broadcast receiver according to another embodiment.

FIG. 6 shows a block diagram of digital broadcast receiver 400 according to a second embodiment of the present invention. Of course, all aspects and advantages that were described for the first embodiment also apply to the second embodiment. Furthermore, functional units that are common to both embodiments are described using the same reference symbols and have the same properties and functions.

As shown in FIG. 6, digital broadcast receiver 400 comprises several receiving modules 402A, 402B and 402C which can be coupled to antenna 316. Each of receiving modules 402A, 402B and 402C has an HF front-end module 404A, 404B and 404C and a channel decoder 406A, 406B and 406C. Each of HF front-end modules 404A, 404B and 404C there has the same properties and functions as described above for HF front-end module 304, and each of channel decoders 406A, 406B and 406C has the same properties and functions as described above for channel decoder 306.

The number of receiving modules is not fixed to three, but can be selected as required According to the present invention, digital broadcast receiver 400 comprises at least two receiving modules, namely a first receiving module (in FIG. 6, for example, receiving module 402A) which can be tuned to a foreground broadcast service, and at least one second receiving module (in FIG. 6, for example, receiving modules 406B and 406C) which can be tuned to a background broadcast service. Each of receiving modules 402A, 402B and 402C can select a frequency channel and extract program information of the broadcast services that are associated with the respective frequency channel. The selection of the background broadcast services is there also limited to broadcast services that are transmitted in the frequency channel of the foreground broadcast service.

Furthermore, digital broadcast receiver 400 comprises a decoder module 408 which is switchably coupled to precisely one of first receiving modules 402A. A decoder switching device 418 is provided for this purpose and switchably couples the first receiving module to decoder module 408, for example, receiving module 402A in FIG. 4 (shown by the solid arrow). The second receiving modules, receiving modules 406B and 406C in FIG. 4, are initially not coupled to decoder module 408 (shown by the dashed arrows).

Decoder module 408 has a source decoder that is fixedly coupled to output module 312. The source decoder has the same properties and functions as described above.

Furthermore, digital broadcast receiver 400 comprises a control unit 414 which is adapted to control receiving module 402A, 402B and 402C and decoder modules 408.

In particular, control unit 414 determines a foreground broadcast service based on an input signal that control unit 414 receives in response to user input. It can be entered, for example, by way of an input unit of digital broadcast receiver 400.

After the foreground broadcast service has been determined, control unit 414 tunes first receiving module 402A and first decoder module 408 to the new foreground broadcast service. In addition, control unit 414 ensures that output module 408 is coupled to first decoder module 402A.

Furthermore, control unit 314 determines background broadcast services based on the selected foreground broadcast service and one of the predefined rules described above. It is presently to be noted that the number of background broadcast services in the second embodiment can be selected freely since each of channel decoders 406A, 406B and 406C can have a memory in which the extracted program information of the foreground broadcast service and the background broadcast services can be temporarily stored.

Control unit 414 can there determine the background broadcast services anew each time after an input signal has been received in response to the selection of a new foreground broadcast service.

After the background broadcast services have been determined, control unit 414 tunes second receiving modules 406B and 406C to one of the determined background broadcast services. In this way, each of second receiving modules 406B and 406C can extract the program information associated with a background broadcast service. Since the background broadcast services do not necessarily have to be located in different frequency channels, the number of second receiving modules actuated by control unit 414 can depend on the distribution of the background broadcast services to the frequency channels.

With the aid of decoder switching device 418, control unit 414 can couple decoder module 408 to one of second receiving modules 406B and 406C if the corresponding background broadcast service has been selected as the new foreground broadcast service. Decoder module 408 can then, without great delay, decode the program information associated with the new foreground broadcast service and output it as an output signal to output module 312. In this way, the switching time between the foreground broadcast service and the respective background broadcast service can be greatly reduced, since the source decoder can start decoding the new program information immediately after the switching.

Figure 7:
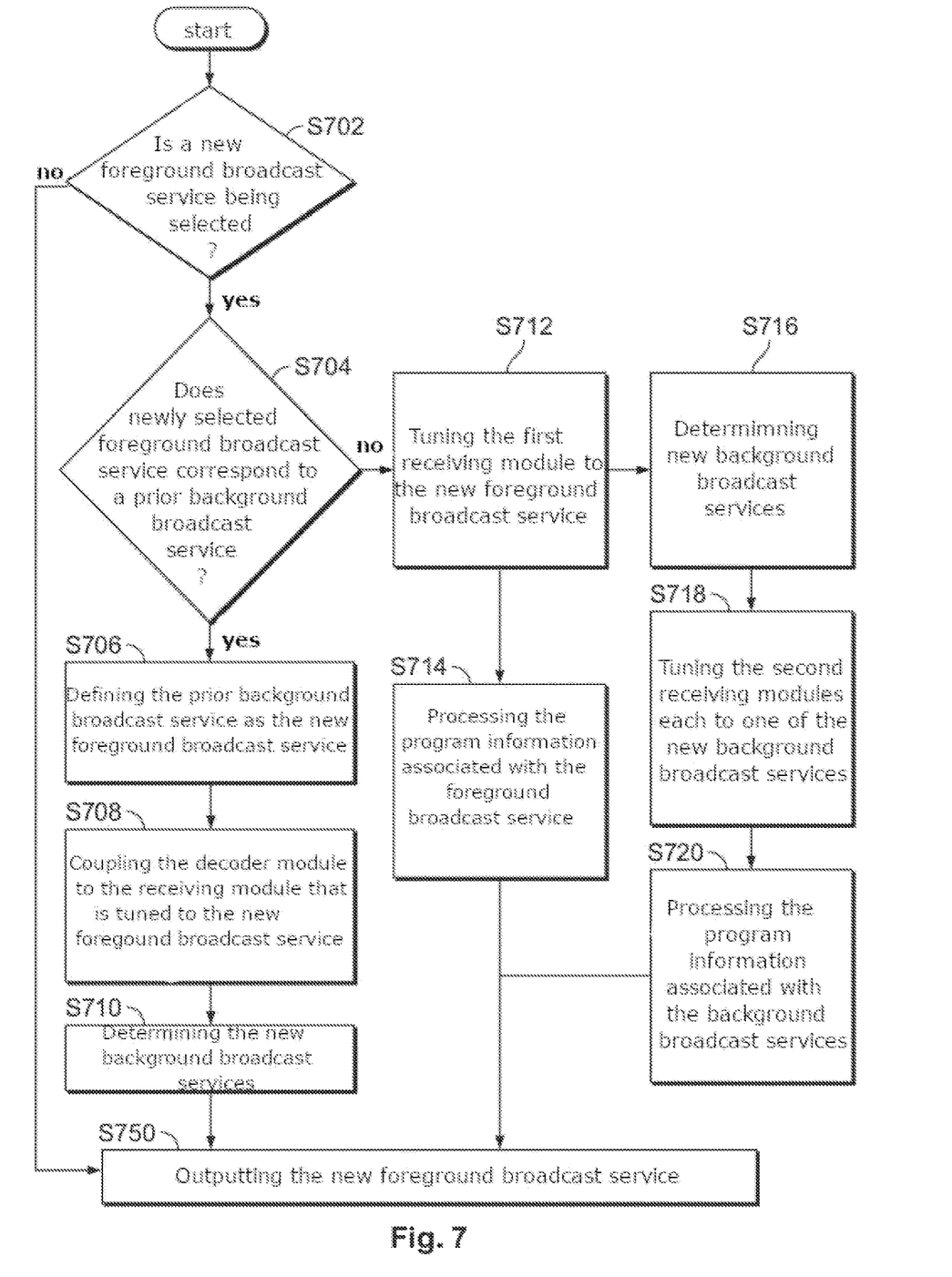
FIG. 7 is a flowchart of a method for switching a broadcast service with the digital broadcast receiver of FIG. 6.

A process sequence which is carried out by digital broadcast receiver 400 shall now be explained with reference to FIG. 7. For this purpose, FIG. 7 shows a flow chart of a method for switching a broadcast service with the aid of digital broadcast receiver 400. To illustrate this, it is assumed by way of example that receiving module 402A initially serves as the first receiving module, while receiving modules 402B and 402C initially serve as the second receiving modules. However, all other arrangements described above are also conceivable.

Control unit 414 repeats the process shown in FIG. 7 at a fixed time interval. This can be, for example, between 0 and 1s. In a first step (S702), control unit 314 verifies whether an input signal has been received in the preceding time interval that indicates the selection of a new foreground broadcast service by the user. If no input signal has been received ("no" in S702), then digital broadcast receiver 400 continues to output the prior foreground broadcast service (S750) and ends the process. If an input signal has been received ("yes" in S702), control unit 414 verifies whether the newly selected foreground broadcast service corresponds to one of the prior background broadcast services (S704).

If this is the case ("yes" in S504), control unit 414 defines the prior background broadcast service as the new foreground broadcast service (S706) and controls decoder switching device 418 in order to couple decoder module 408 to that one of receiving modules 402A, 402B or 402C (S708) which is tuned to the new foreground broadcast service. Furthermore, control device 414 tunes decoder module 408 to the new foreground broadcast service. Control unit 414 then determines new background broadcast services (S710) in accordance with one of the predefined rules described above and tunes the new second receiving modules to the new background broadcast services. The digital broadcast receiver now outputs the new foreground broadcast service (S750).

If the newly selected foreground broadcast service in step S704 does not correspond to any of the prior broadcast services ("no" in S704), then the process moves to step S712. In this step, the control unit tunes first receiving module 402A and first decoder module 408 to the new foreground broadcast service. First decoder module 402A is there preferably tuned to the new foreground broadcast service since the former is already coupled to decoder module 408. The digital broadcast receiver then starts processing (S714) the program information associated with the foreground broadcast service.

In addition, control unit 414 determines new background broadcast services according to one of the predefined rules described above (S716). The control unit then tunes second receiving modules 402B and 402C to the new background broadcast services so that second receiving modules 402B and 402C can process the program information associated with the new background broadcast services (S720). The process ends with the output of the new foreground broadcast service (S750).

Figure 8:
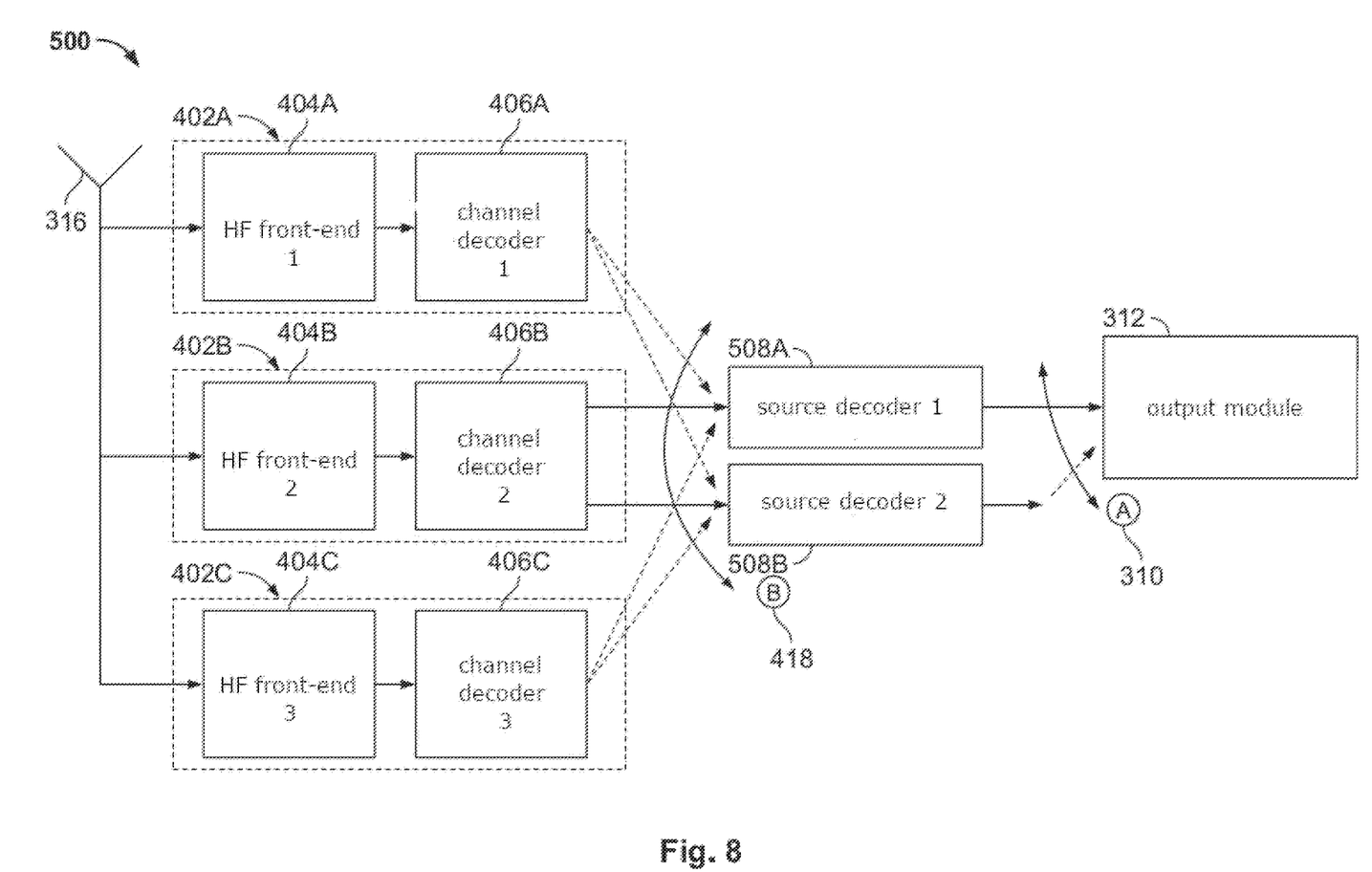
FIG. 8 is a block diagram of a digital broadcast receiver according to another embodiment.

FIG. 8 shows a block diagram of digital broadcast receiver 500 according to a third embodiment of the present invention. In order to ensure better clarity, control unit 414 is not shown in FIG. 8. Of course, all aspects and advantages that were described for the preceding embodiments also apply to the third embodiment. Furthermore, functional units that match one of the two preceding embodiments are described using the same reference symbols and have the same properties and functions.

As shown in FIG. 8, digital broadcast receiver 500 according to the third embodiment corresponds in essential parts to broadcast receiver 400 according to the second embodiment.

However, digital broadcast receiver 500 comprises several decoder modules 508A and 508B (in this example, two), each of which has a source decoder, and which are switchably coupled to one of receiving modules 402A, 402B and 402C via decoder switching device 418. In FIG. 4, for example, both decoder modules 508A and 508B are switchably coupled to receiving module 402B (first receiving module), shown schematically by the solid arrows. As indicated by dashed arrows in FIG. 8, decoder modules 508A and 508B can also be switchably coupled to one of the other receiving modules 402A and 402C (second receiving modules) with the aid of decoder switching device 418. Where not all decoder modules need to be coupled to the same receiving module.

Furthermore, digital broadcast receiver 500 comprises output switching device 310 with which control unit 414 couples that one of decoder modules 508A which is tune to the foreground broadcast service to output module 312. In the example of FIG. 8, this is initially decoder module 508A (indicated by the solid arrow in FIG. 8) which therefore serves as the first decoder module. As shown by a dashed arrow, however, decoder module 508B (initially a second decoder module) can also be switchably coupled to output module 312 via output switching device 310.

Figure 9:
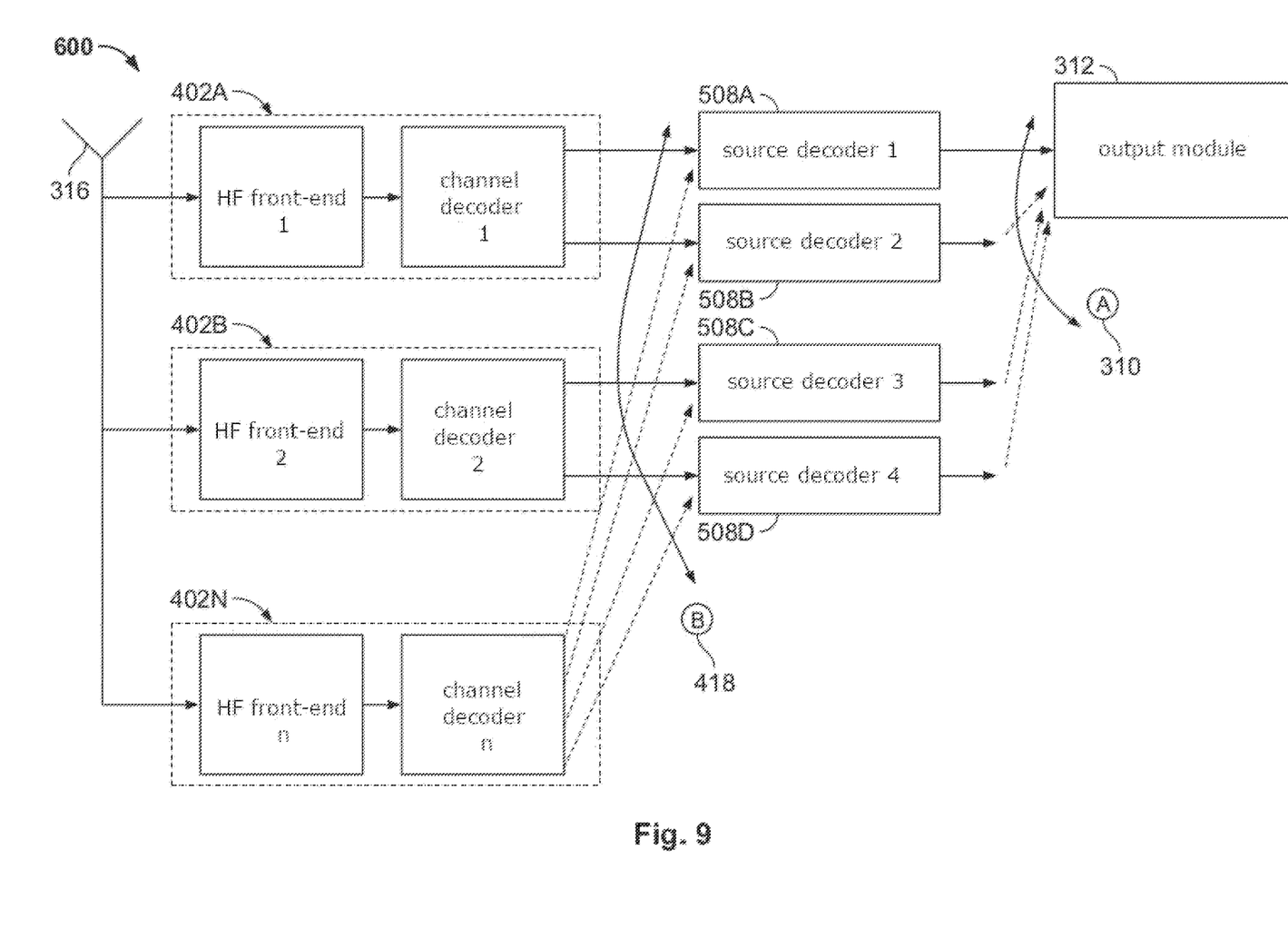
FIG. 9 is a block diagram of a digital broadcast receiver according to another embodiment.

FIG. 9 shows a block diagram of digital broadcast receiver 600 according to a fourth embodiment of the present invention. In order to ensure better clarity, control unit 414 is not shown in FIG. 7. As shown in FIG. 8, digital broadcast receiver 600 corresponds in essential parts to broadcast receiver 500 according to the third embodiment, and is intended to illustrate that the number of receiving modules and decoder modules can be selected variably.

Digital broadcast receiver 600 can comprise up to N receiving modules, of which, for example, receiving module 402A is selected as the first receiving module, whereas the remaining N−1 receiving modules are selected as the second receiving modules. Digital broadcast receiver 600 also comprises up to M decoder modules. For better clarity, only 4 source decoders are drawn in in FIG. 9 by way of example. For example, decoder module 508A is selected there as the first decoder module, whereas decoder modules 508B, 508C and 508D are selected as second decoder modules. As shown schematically in FIG. 9, decoder switching device 418 ensures a high level of flexibility, since each of the decoder modules can be switchably coupled with the aid of decoder switching device 418 to one of the receiving modules. Further flexibility is obtained by output switching device 310, since output module 312 can be switchably coupled with the aid of output switching device 310 to each of the decoder modules.

With these arrangements, digital broadcast receiver 500 and digital broadcast receiver 600 can achieve greater flexibility in determining the background broadcast services. Firstly, the provision of several receiving modules ensures that a background broadcast service does not have to be restricted to the frequency channel of the foreground broadcast service. Furthermore, by providing several decoder modules, it is possible to provide several background output signals, each containing the decoded program information of a background broadcast service, parallel to the output signal which contains the decoded program information of the foreground broadcast service.

The output can therefore be switched between the foreground broadcast service and a background broadcast service without much delay. By determining background broadcast services, it is possible to limit parallel processing to a few broadcast services and to reduce computing performance and energy consumption. In other words, the present invention makes it possible to provide a digital broadcast receiver which exhibits a rapid switching behavior between individual broadcast services while at the same time limiting the required computing performance. The space requirements and computing performance of the digital broadcast receiver can be reduced, since in total only one HF front-end module and one channel decoder are required to make the respective signals available. The background broadcast services can each be determined in accordance with the above-described method and predetermined rules. The broadcast receiver and the broadcast receiver system of the disclosed embodiments are also inexpensive to manufacture and economical to operate.

For this purpose, the control unit tunes the second receiving modules and the second background modules to the background broadcast services based on the determined background broadcast services. Furthermore, the control unit ensures that decoder circuit 418 is switched such that the decoder modules that are tuned to a background broadcast service, is connected to the receiving module which is coupled in a tuned manner to the same background broadcast service.

With the aid of output switching device 310, the control unit can then couple output module 312 to one of the second decoder modules if the corresponding background broadcast service has been selected as the new foreground broadcast service. Output module 312 can then output the prior background output signal of the corresponding decoder module as a new output signal without any great delay. In this way, the switching time between the foreground broadcast service and the respective background broadcast service can be greatly reduced.

The present invention also relates to a digital broadcast receiver system comprising the digital broadcast receiver according to the above embodiments and a receiving device.

What is claimed is:

1. A digital broadcast receiver, comprising:
a first receiving module coupled to a receiving device for receiving a digital broadcast signal, the first receiving module is tunable to a foreground broadcast service in order to extract a program information associated with the foreground broadcast service;

a first decoder module coupled to the first receiving module and tunable to the foreground broadcast service to decode the program information associated with the foreground broadcast service;
an output module switchably coupled to the first decoder module and adapted to output the program information associated with the foreground broadcast service and decoded as an output signal;
at least one second decoder module coupled to the first receiving module and tunable to a background broadcast service to decode a program information associated with the background broadcast service; and
a control unit adapted to tune the first receiving module and the first decoder module to the foreground broadcast service and to tune each of the at least one second decoder modules to one of a plurality of background broadcast services, the control unit determines the foreground broadcast service based on a user input and determines the background broadcast services based on the foreground broadcast service and a predefined rule.

2. The digital broadcast receiver of claim 1, wherein the control unit is adapted to verify, based on an input signal received in response to a selection of a new foreground broadcast service, whether the new foreground broadcast service corresponds to one of the background broadcast services, and if the new foreground broadcast service corresponds to one of the background broadcast services, the control unit determines the background broadcast service that corresponds to the new foreground broadcast service as the new foreground broadcast service and switchably couples the output module to one of the at least one second decoder modules that is tuned to the new foreground broadcast service.

3. The digital broadcast receiver of claim 1, wherein
the first receiving module includes:
a first HF front-end module adapted to select a frequency channel of the foreground broadcast service from the digital broadcast signal and to convert the frequency channel to a data stream; and
a first channel decoder adapted to decode the data stream and to extract from the data stream the program information associated with the foreground broadcast service and the background broadcast services;
the first decoder module includes a first source decoder adapted to decode the program information associated with the foreground broadcast service and convert it to the output signal; and
the at least one second decoder module includes a second source decoder adapted to decode the program information associated with the background broadcast service and to convert it to a background output signal.

4. The digital broadcast receiver of claim 1, further comprising an output switching device adapted to switchably couple the first decoder module or one of the at least one second decoder modules to the output module.

5. The digital broadcast receiver of claim 3, wherein the first channel decoder has a memory unit and is adapted to temporarily store the program information associated with the foreground broadcast service and the background broadcast services in the memory unit.

6. The digital broadcast receiver of claim 1, wherein the first receiving module is adapted to extract the program information that is encoded according to a digital audio broadcasting standard DAB or DAB+.

7. A digital broadcast receiver, comprising:
a first receiving module coupled to a receiving device for receiving a digital broadcast signal, the first receiving module is tunable to a foreground broadcast service in order to extract a program information associated with the foreground broadcast service;
a first decoder module switchably coupled to the first receiving module and tunable to the foreground broadcast service to decode the program information associated with the foreground broadcast service;
an output module switchably coupled to the first decoder module and adapted to output the program information associated with the foreground broadcast service and decoded as an output signal;
at least one second receiving module coupled to the receiving device for receiving the digital broadcast signal, the at least one second receiving module is tunable to a background broadcast service to extract a program information associated with the background broadcast service; and
a control unit adapted to tune the first receiving module and the first decoder module to the foreground broadcast service and to tune each of the at least one second receiving modules to one of a plurality of background broadcast services, the control unit determines the foreground broadcast service based on a user input and determines the background broadcast services based on the foreground broadcast service and a predefined rule.

8. The digital broadcast receiver of claim 7, wherein the control unit is adapted to verify, based on an input signal received in response to a selection of a new foreground broadcast service, whether the new foreground broadcast service corresponds to one of the background broadcast services, and if the new foreground broadcast service corresponds to one of the background broadcast services, the control unit determines the background broadcast service that corresponds to the new foreground broadcast service as the new foreground broadcast service and switchably couples the first decoder module to one of the at least one second receiving modules that is tuned to the new foreground broadcast service.

9. The digital broadcast receiver of claim 7, wherein
the first receiving module includes:
a first HF front-end module adapted to select a frequency channel of the foreground broadcast service from the digital broadcast signal and to convert the frequency channel to a first data stream; and
a first channel decoder adapted to decode the first data stream and to extract from the first data stream the program information associated with the foreground broadcast service and the background broadcast services;
each of the second receiving modules includes:
a second HF front-end module adapted to respectively select from the digital broadcast signal a frequency channel of the background broadcast service and to convert the frequency channel to a second data stream;
a second channel decoder adapted to decode the second data stream and to extract from the second data stream the program information associated with the background broadcast service; and
the first decoder module includes a first source decoder switchably coupled to the first channel decoder and adapted to decode the program information associated with the foreground broadcast service and to convert it to the output signal.

10. The digital broadcast receiver of claim 7, further comprising a decoder switching device adapted to switchably couple the first receiving module or one of said at least one second receiving modules to the first decoder module.

11. The digital broadcast receiver of claim 7, wherein the first receiving module has a first memory unit and is adapted to temporarily store the program information associated with the foreground broadcast service in the first memory unit, and each of the at least one second receiving modules has a second memory unit and is adapted to temporarily store the program information associated with the background broadcast service in the second memory unit.

12. The digital broadcast receiver of claim 7, further comprising at least one second decoder module switchably coupled to the first receiving module or to one of the at least one second receiving modules and which can respectively be tuned to the background broadcast service for decoding program information associated with the background broadcast service.

13. The digital broadcast receiver of claim 12, wherein each of the at least one second decoder modules has a second source decoder which is adapted to decode the program information associated with one of the background broadcast services and to convert it to a background output signal.

14. The digital broadcast receiver of claim 12, further comprising an output switching device adapted to switchably couple the first decoder module or one of the at least one second decoder modules to the output module, the decoder switching device is adapted to switchably couple each of the at least one second decoder modules to the first receiving module or to one of the at least one second receiving modules.

15. The digital broadcast receiver of claim 7, wherein the first receiving module and the at least one second receiving module extract the program information that is encoded according to a digital audio broadcasting standard DAB or DAB+.

16. The digital broadcast receiver of claim 7, further comprising a memory unit in which a list of broadcast services is stored, the control unit determines a broadcast service as the background broadcast service based on the predefined rule when the broadcast service in the list is a broadcast service adjacent to the foreground broadcast service.

17. The digital broadcast receiver of claim 7, further comprising a memory unit in which a list with a predefined number of most recently selected broadcast services is stored, the control unit determines a broadcast service as the background broadcast service based on the predefined rule if the broadcast service is stored in the list.

18. The digital broadcast receiver of claim 7, further comprising a memory unit in which a list of broadcast services is stored, each of the broadcast services is assigned a natural number that corresponds to a frequency of occurrence with which the broadcast service has been determined as the foreground broadcast service in the past, the control unit determines a broadcast service according to the predefined rule as the background broadcast service if its frequency of occurrence is higher than the other broadcast services.

19. The digital broadcast receiver of claim 18, wherein the frequency of occurrence assigned to each of the broadcast services is stored in dependence on the foreground broadcast service.

20. A digital broadcast receiver system, comprising:
a receiving device; and
a digital broadcast receiver including:
a first receiving module coupled to the receiving device for receiving a digital broadcast signal, the first receiving module is tunable to a foreground broadcast service in order to extract a program information associated with the foreground broadcast service;
a first decoder module switchably coupled to the first receiving module and tunable to the foreground broadcast service to decode the program information associated with the foreground broadcast service;
an output module switchably coupled to the first decoder module and adapted to output the program information associated with the foreground broadcast service and decoded as an output signal;
at least one second receiving module coupled to the receiving device for receiving the digital broadcast signal, the at least one second receiving module is tunable to a background broadcast service to extract a program information associated with the background broadcast service; and
a control unit adapted to tune the first receiving module and the first decoder module to the foreground broadcast service and to tune each of the at least one second receiving modules to one of a plurality of background broadcast services, the control unit determines the foreground broadcast service based on a user input and determines the background broadcast services based on the foreground broadcast service and a predefined rule.

\* \* \* \* \*

UNITED STATES PATENT AND TRADEMARK OFFICE
CERTIFICATE OF CORRECTION

| | | |
|---|---|---|
| PATENT NO. | : 11,784,736 B2 | Page 1 of 1 |
| APPLICATION NO. | : 17/090323 | |
| DATED | : October 10, 2023 | |
| INVENTOR(S) | : Thomas Mueller | |

It is certified that error appears in the above-identified patent and that said Letters Patent is hereby corrected as shown below:

On the Title Page

Please insert Foreign Application Priority Data:
--Foreign Application Priority Data
November 8, 2019 (DE).....................................202019106206.1--

Signed and Sealed this
Twelfth Day of December, 2023

*Katherine Kelly Vidal*

Katherine Kelly Vidal
*Director of the United States Patent and Trademark Office*